May 14, 1963  C. H. KIRK, JR  3,089,513
COMBINATION FILL VALVE AND EXPANSION TANK
Filed Dec. 1, 1960  5 Sheets-Sheet 1

INVENTOR
CHESTER HOWARD KIRK, JR.
BY William Frederick Werner
ATTORNEY

May 14, 1963
C. H. KIRK, JR
3,089,513
COMBINATION FILL VALVE AND EXPANSION TANK
Filed Dec. 1, 1960
5 Sheets-Sheet 2
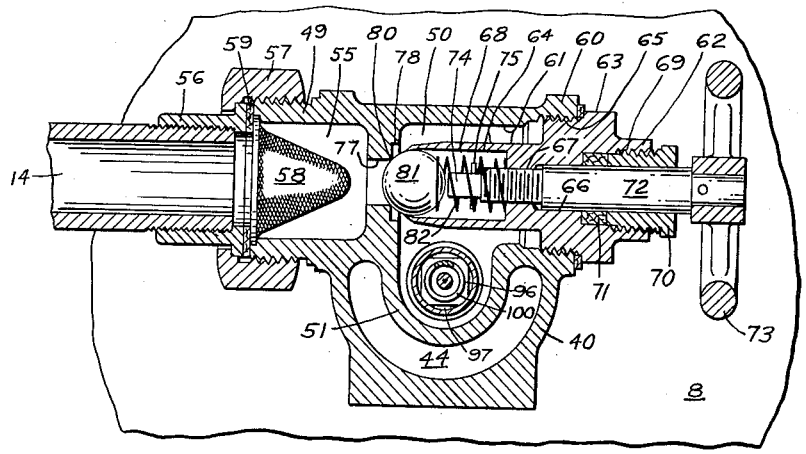
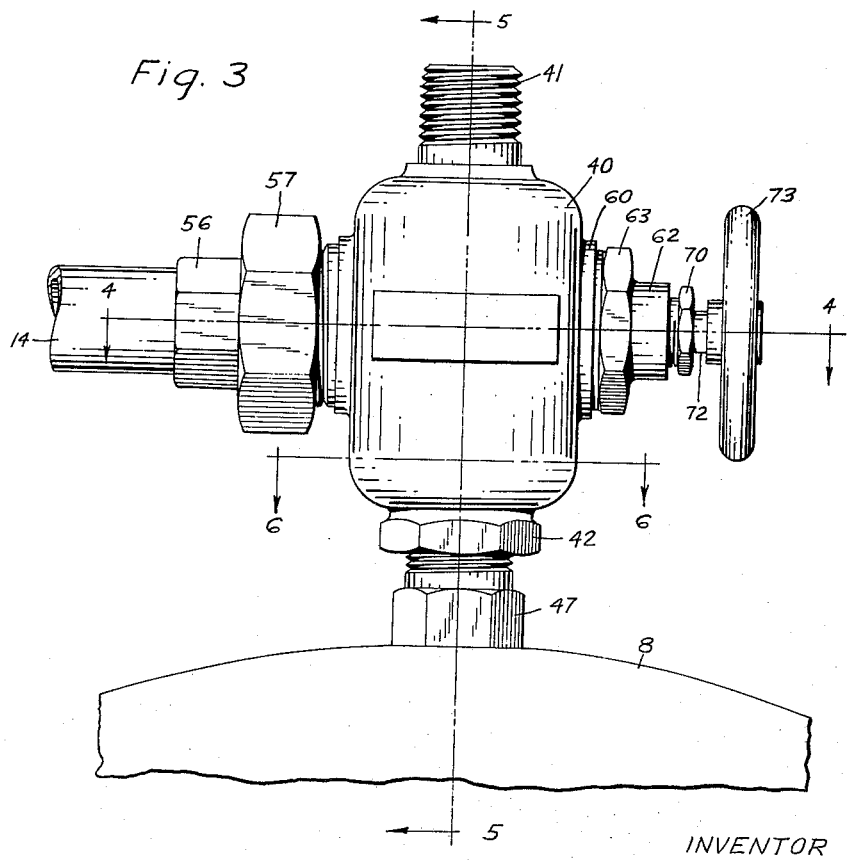
INVENTOR
CHESTER HOWARD KIRK, JR.
BY *William Frederick Werner*
ATTORNEY May 14, 1963   C. H. KIRK, JR   3,089,513
COMBINATION FILL VALVE AND EXPANSION TANK
Filed Dec. 1, 1960   5 Sheets-Sheet 3
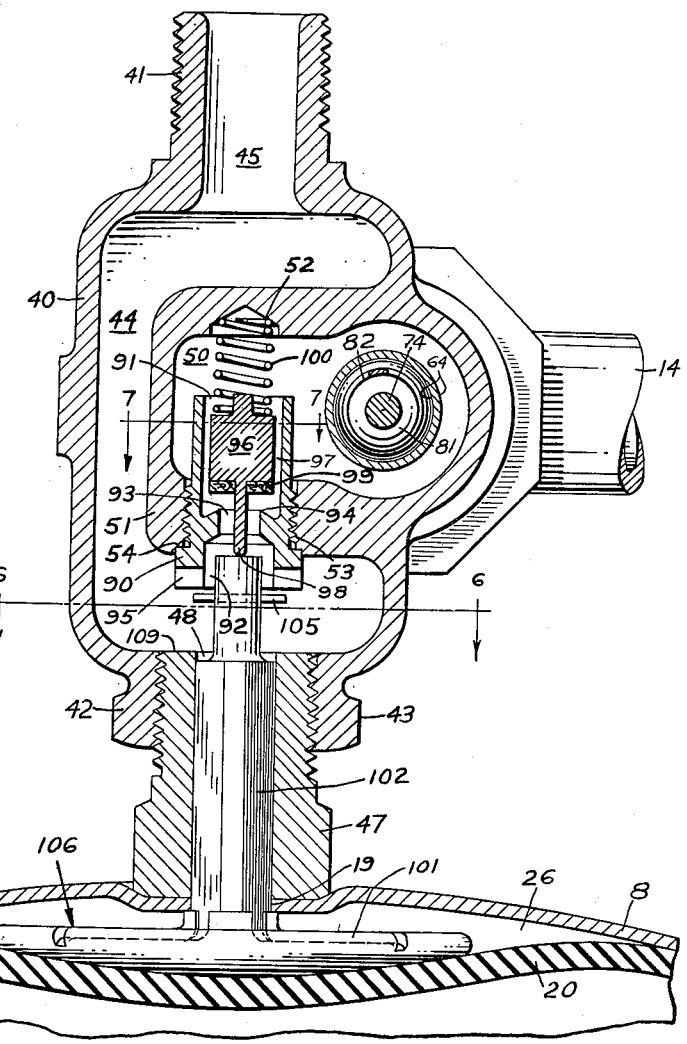
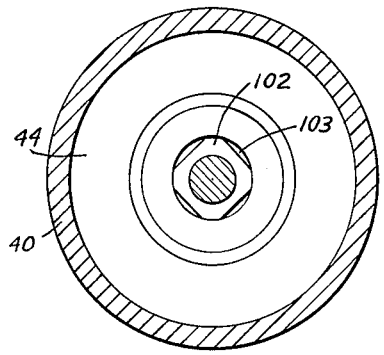
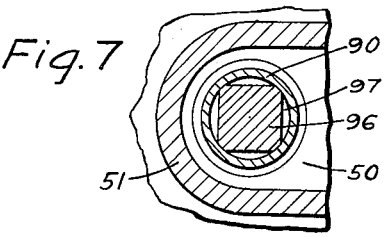
INVENTOR
CHESTER HOWARD KIRK, JR.
BY William Frederick Werner
ATTORNEY May 14, 1963  C. H. KIRK, JR  3,089,513
COMBINATION FILL VALVE AND EXPANSION TANK
Filed Dec. 1, 1960  5 Sheets-Sheet 4

INVENTOR
CHESTER HOWARD KIRK, JR.
BY William Frederick Werner
ATTORNEY

May 14, 1963 C. H. KIRK, JR 3,089,513
COMBINATION FILL VALVE AND EXPANSION TANK
Filed Dec. 1, 1960 5 Sheets-Sheet 5

INVENTOR
CHESTER HOWARD KIRK, JR.
BY William Frederick Werner
ATTORNEY

United States Patent Office 3,089,513
Patented May 14, 1963

3,089,513
COMBINATION FILL VALVE AND
EXPANSION TANK
Chester Howard Kirk, Jr., 14 Glen Ave.,
Cranston, R.I.
Filed Dec. 1, 1960, Ser. No. 73,117
4 Claims. (Cl. 137—505.34)

This invention relates to automatic fill valves and more particularly to improvements in construtcion of a combination fill valve and pressurized expansion tank.

One of the objects of the present invention is to provide an improved fluid control mechanism and expansion tank wherein the expansion tank includes a diaphragm which serves the dual function of being both a flexible barrier between the system fluid and the pressure cushion, and the means for controlling operation of a valve which in turn controls the flow of fluid into the system.

Another object of the present invention is to provide a novel fill valve and expansion tank combination for hot water heating systems and the like wherein variations in pressure and volume in the system are accommodated and the requirement for additional fluid in the system automatically satisfied.

Still another object of the present invention is to provide a hot water heating system with novel means for maintaining a preselected minimum pressure through the use of a combination fill valve and pressurized expansion tank combination.

And still another object of the present invention is to provide a combination fill valve and expansion tank which is easily adjusted to change the minimum pressure in a hot water heating system, so that the same fill valve can be used in a variety of hot water heating systems requiring different minimum pressures.

Other objects of the present invention will become apparent in part and be pointed out in part in the following specification and claims.

In the past similar valves were regulator valves. That is, the valves regulated the pressure in a water system. The present invention is adapted to maintain a constant and uniform minimum pressure in a hot water heating system while providing means for the expansion and contraction of the water as it is heated and allowed to cool off. In the past a similar function was provided with the use of two separate units. One unit was an expansion tank. The other unit was a pressure regulating valve. The expansion tank was provided with a diaphragm and the valve was provided with a diaphragm. The present invention combines the two units into a single unit having a single diaphragm. The single diaphragm serves the two functions of the prior art two separate diaphragms.

Reference is now made to the drawings, wherein similar characters of reference indicate corresponding parts in all the figures.

FIGURE 3 is an enlarged side elevational view of the valve element and a fragmentary section of the bladder expansion tank element.

FIGURE 4 is a transverse cross sectional view taken along line 4—4 of FIGURE 3.

FIGURE 5 is a vertical cross sectional view taken along line 5—5 of FIGURE 3.

FIGURE 6 is a horizontal cross sectional view taken along line 6—6 of FIGURE 5.

FIGURE 7 is a horizontal cross sectional view taken along line 7—7 of FIGURE 5.

Figure 1:
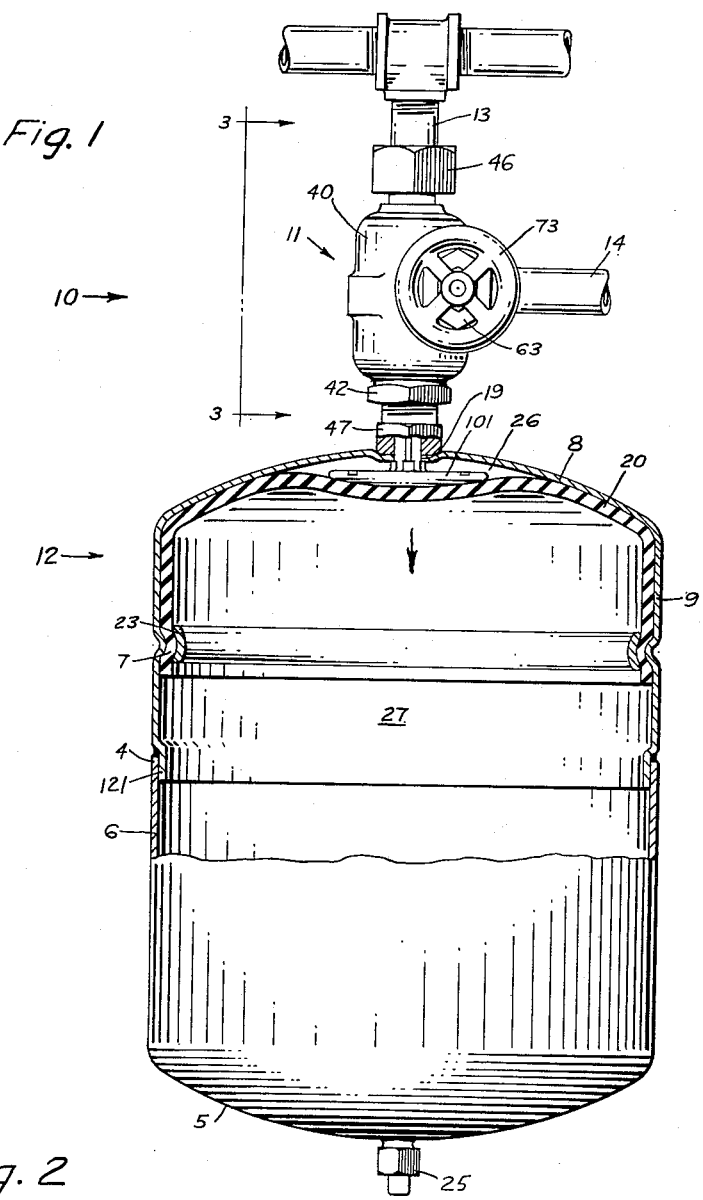
FIGURE 1 is a side elevational view, partly in section, of the new and improved combination fill valve and expansion tank.
Figure 2:
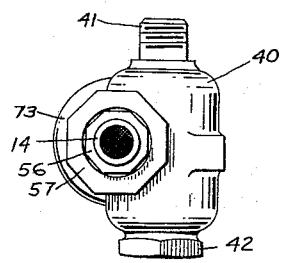
FIGURE 2 is a rear elevational view of the valve element.
Figure 8:
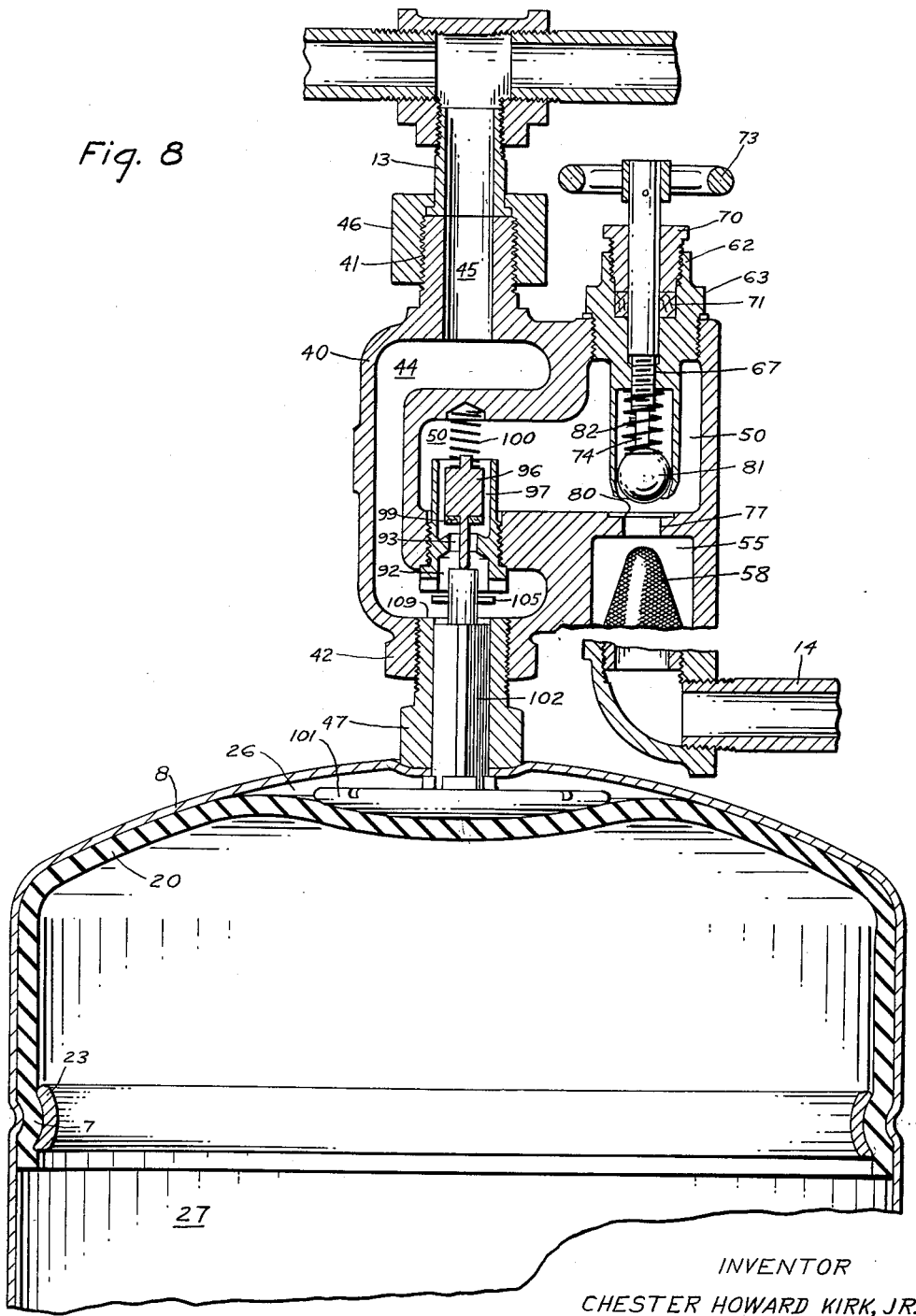
FIGURE 8 is a view, similar to FIGURE 5, adapted to illustrate, in partly schematic form, the operational position of the several parts in the new and improved combination fill valve and expansion tank.

In proceeding with this invention reference is made to FIGURE 1 wherein reference numeral 10 generally indicates the new and improved combination fill valve and expansion tank. Reference numeral 11, generally indicates the valve element. Reference numeral 12, generally indicates the expansion tank. Reference numeral 13 indicates the pipe leading from valve 11 to a hot water heating system. Pipe 14 is the high pressure cold water supply line leading from a reservoir to the valve 11.

Expansion tank 12 is the subject of my copending application, Serial No. 850,872, filed November 4, 1959, now Patent No. 3,035,614, issued May 22, 1962.

Expansion tank 12 consists of an upper cylindrical body member formed with a tubular side 9. Tubular side 9 is provided with a skirt 121 on one end. The body member has a closed end shaped in the form of a dome 8. Tubular side 6 is open at one end 4. End 4 is fixed to skirt 121 by means of welding to form a tank. Dome 5 is provided with an orifice in which an air inlet valve or fitting 25 is positioned and secured.

A flexible diaphragm 20 is preformed so that in one operative position, as shown in FIGURE 1, the diaphragm is shaped to engage tubular side 9 and dome 8. A bead 7 is provided in the peripheral edge of flexible diaphragm 20. A concaved retaining ring 23 is provided to mate with bead 7 and anchor preformed flexible diaphragm 20 to tubular side 9. Thus, flexible diaphragm 20 divides the tank into two non-communicating sections 26, 27. Section 27 is termed the charged or pressure section. Section 26 is termed the fluid expansion section.

The valve 11 consists of a body member 40 having an externally threaded projection 41 on one end and an internally threaded projection 42 formed with an external pipe gripping surface 43 on the other end. As viewed in FIGURE 5, body member 40 is provided with a chamber 44, which is generally horizontally U shaped. One end of the U is in direction communication with a passageway 45, located in externally threaded projection 41, and leading to the hot water heating system. Pipe 13 is a continuation of passageway 45 and is connected to externally threaded projection 41 by means of a nut 46. A pipe fitting 47 provided with an axial passageway 48 is secured in internally threaded projection 42 on one end and is attached to dome 8 on the other end, by means of welding, so that the other end of the U in chamber 44 is in communication with fluid expansion section 26 through orifice 19.

Body member 40 is also provided with a cavity 50. Cavity 50 is separated from chamber 44 by means of a wall 51, generally oval in shape. Wall 51 is provided with a countersink at 52 and a threaded area 53 having a counterbore at 54, for purposes which will presently appear. It will be observed that cavity 50 is in communication with chamber 44 through threaded area 53.

With reference to FIGURE 4, body member 40 is also provided with a second externally threaded projection 49 having a compartment 55. High pressure cold water supply line pipe 14 is attached to second externally threaded projection 49, so as to be in direct communication with compartment 55, by means of a union coupling 56 and a union nut 57. A strainer 58 is located in compartment 55 and is secured therein by means of union coupling 56 and union nut 57 which rotatively engages the threads of threaded projection 49. A washer 59 is interposed between the end of sieve 58 and the end of union coupling 56.

Body member 40 is provided with a circular boss 60 having an axial passageway 61 leading into cavity 50. A bushing 62 having a shoulder 63 and a reduced portion 64 is removably secured in circular boss 60 by means of threads 65. Bushing 62 is provided with an axial bore 66 having threads at 67, a hollow area at 68 and an enlarged bore having threads 69. An adjustable cap 70 is rotatively mounted in threads 69. Fluid packing 71 is located in the enlarged bore having threads 69. A shaft 72, having a hand wheel 73 fixed to one end is rotatively mounted in adjustable cap 70 and bushing 62 with a threaded area engaging threads 67. Shaft 72 is provided with a reduced end 74. A retaining ring 75 on reduced end 74 limits the longitudinal movement of shaft 72.

Wall 51 is provided with a passageway 77 having a counterbore 78. A valve seat 80 is formed at the juncture of passageway 77 and counterbore 78. Passageway 77 provides communication between compartment 55 and cavity 50. A ball valve 81 is adapted to engage valve seat 80. Reduced end 74 abuts ball valve 81. The end of reduced portion 64 retains ball valve 81 in hollow area 68. A spring 82 located in hollow area 68 engages the bottom of hollow area 68 on one end and ball valve 81 on the other end. Thus ball valve 81 may be forced into fluid tight engagement with valve seat 80 by means of reduced end 74 or spring 82 will resiliently hold ball valve against valve seat 80 when reduced end 74 is rotated away from ball valve 81.

A valve or guide bushing 90 provided externally with threads which rotatively engage threads 53 is provided axially with a chamber 91, a counterbored area 92 and a passageway 93. A raised valve seat 94 is provided in guide or valve bushing 90 at the juncture of chamber 91 and passageway 93.

A slot 95 is transversely provided in valve or guide bushing 90.

A plug or piston 96 of square cross-section in the transverse plane is slidably mounted in chamber 91 so that fluid passageways 97 are formed between the walls of chamber 91 and the flat side of the square shape of plug 96. (See FIGURE 7.) Plug or piston 96 is provided with an extension 98. A washer 99 is located at the base of piston or plug 96. A coil spring 100 is interposed between the top of piston or plug 96 and countersink 52.

A valve actuator or fill gate generally indicated by reference character 106, consisting of a head 101 and a stem 102 is slidably mounted in axial passageway 48 of pipe fitting 47. Stem 102 is square in a transverse plane to provide fluid passageways 103 between chamber 44 and section 26. Stem 102 abuts extension 98 so that coil spring 100 yieldingly urges head 101 against flexible diaphragm 20. A pin 105 is secured in stem 102.

In operation let it be assumed that the hot water heating system is empty of water and that a charge of compressed air of between twelve and fifteen pounds per square inch is in charged section 27. Flexible diaphragm 20, valve actuator or fill gate 106 and piston or plug 96 will be positioned as illustrated in FIGURES 1, 3, 5 and 8. The pressure in the hot water heating system will be zero. The pressure at the high pressure cold water supply line pipe 14 will be higher than the charge pressure in section 27. As illustrated in FIGURE 4, hand wheel 73, through shaft 72, holds ball valve 81 against valve seat 80.

Manual turning of hand wheel 73, away from ball valve 81 will cause the pressure in compartment 55 to move ball valve 81 away from valve seat 80 (see FIGURE 8), thereby, allowing water from the cold water high pressure supply line to flow through passageway 77, cavity 50, chamber 91, passageway 93, counterbored area 92, chamber 44, passageway 45 into the hot water heating system. The pressure will build up in the hot water heating system to a pressure exceeding the pressure in charged section 27 of expansion tank 12. Then flexible diaphragm 20 will be pressed, downwardly in the direction of the arrow in FIGURE 1. Fill gate or valve actuator 106, under the influence of coil spring 100, will also move downwardly, in the direction of said arrow, thereby, causing washer 99 to engage valve seat 94 (see FIGURE 9). Thus, the cold water supply is shut off and the heating system is ready to operate.

Figure 9:
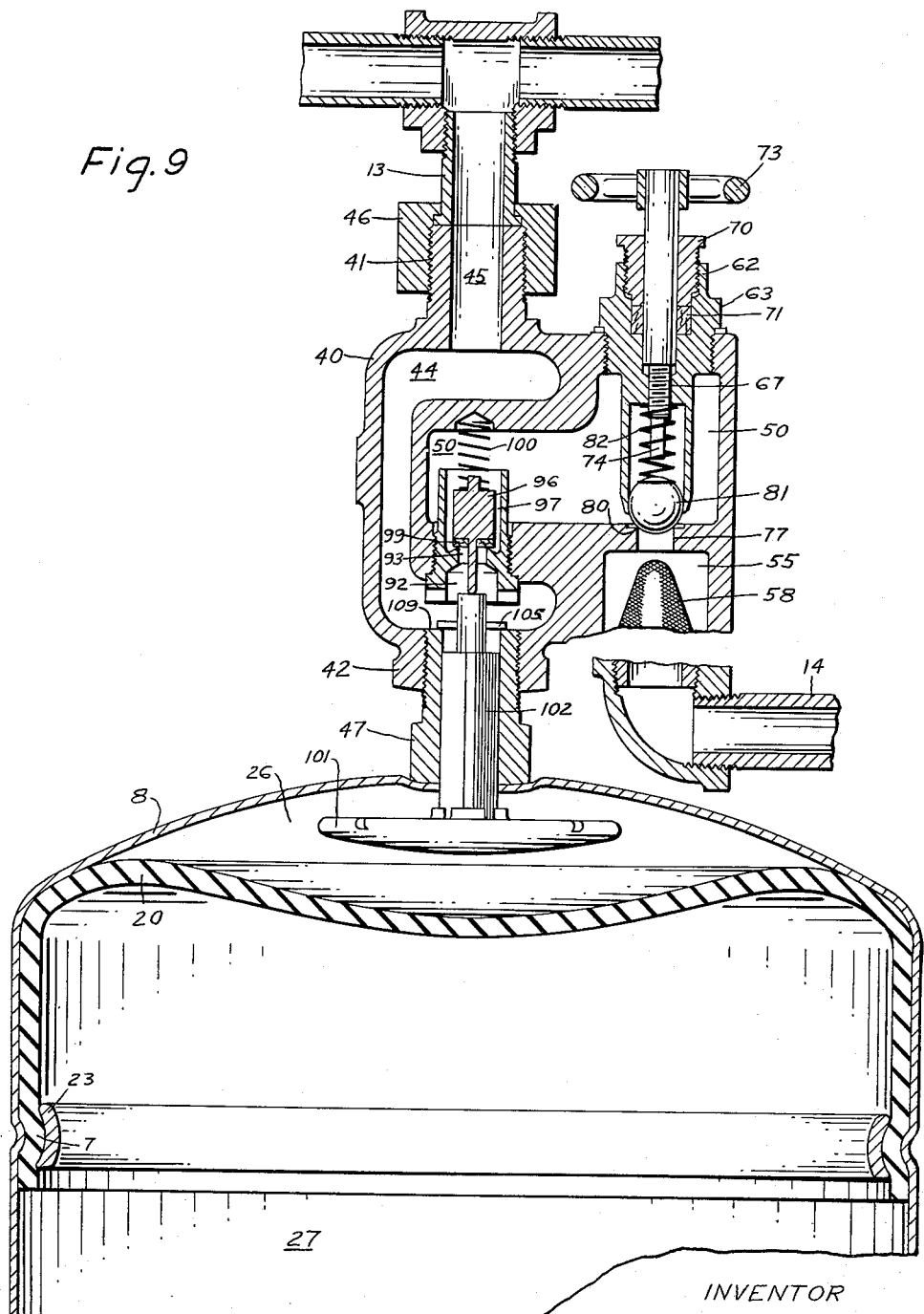
FIGURE 9 is a view, similar to FIGURE 8, illustrating the several parts in an opposite operational position to the positions shown in FIGURE 8.

When the hot water in the hot water heating system is heated, and it expands, flexible diaphragm 20 may move further downwardly, in the direction of the arrow, FIGURES 1 and 9, to provide for the expansion.

Pin 105 limits the downward position of fill gate or valve actuator 106 by engaging surface 109.

As the hot water cools off and contracts, flexible diaphragm 20 will move upwardly in a direction opposite to the direction of the arrow in FIGURE 1, to maintain pressure on the water in the hot water heating system.

When the pressure in the hot water heating system falls, due to a leak or the removal of water from the hot water heating system, or entrapped air, below the pressure in charged section 27, flexible diaphragm 20 will move back to the position shown in FIGURE 1, wherein washer 99 is moved away from valve seat 94, through the upward movement of valve actuator or fill gate 106. Water from the cold water high pressure supply line can once again enter the hot water heating system. Thus the cycle is repeated.

It is obvious that ball valve 81 is a check and shut-off valve. The automatic fill valve would operate without it. That is, a shut-off valve could be placed in any section of the high pressure cold water supply line. As a check valve, ball valve 81 prevents the water in the hot water heating system from flowing backward into the cold water supply line when washer 99 is away from valve seat 94 and the pressure in the cold water supply line is less than the pressure in the hot water heating system.

Having shown and described a preferred embodiment of the present invention by way of example, it should be realized that structural changes could be made and other examples given without departing from either the spirit or scope of this invention.

What I claim is:

1. A fluid control mechanism and expansion tank combination comprising an expansion tank, a flexible diaphragm spanning said tank and secured at its edges to said tank to divide the tank into two separate chambers, one of said chambers being a pressure chamber, the other chamber being a fluid expansion chamber, first means adapted to connect said expansion chamber directly to a pressurized fluid system to receive expansion of fluid therefrom, second means adapted to connect said expansion chamber to a source of make-up fluid under pressure, a valve in said second means for controlling communication between said expansion chamber and said source, a valve actuator operatively coupled with said valve to communicate said source with said expansion chamber when the pressure of fluid in said expansion chamber is reduced below a predetermined minimum, means limiting movement of said valve actuator to a selected range, said flexible diaphragm being movable through a range of movement substantially greater than said valve actuator range, said diaphragm being movable in response to variations in pressure of the pressurized fluid system as opposed by the pressure in the pressure chamber, said diaphragm being movable into and out of engagement with said valve actuator to effect operation of said valve means only when said diaphragm moves while in engagement with said actuator.

2. A fluid control mechanism and expansion tank combination comprising an expansion tank, a flexible diaphragm spanning said tank and secured at its edges to said tank so as to divide the tank into two separate chambers, one of said chambers being a pressure chamber the other chamber being an expansion chamber, means adapted to connect the expansion chamber to a pressurized fluid system under lower pressure and a source of make-up fluid under high pressure, a valve in said means for controlling communication between said expansion chamber and said source of higher pressure make-up fluid, a valve actuator operatively coupled with said valve and extending into said expansion chamber and engageable by and disengageable from said diaphragm when the latter is flexed in opposite directions, said actuator when moved by engagement with and movement of said diaphragm actuating said valve to connect said source of make-up fluid and said expansion chamber when the pressure of fluid in said expansion chamber is reduced below a predetermined minimum, and said actuator when disengaged from said diaphragm actuating said valve to close communication between said expansion chamber and said source of high pressure make-up fluid when said pressure of fluid in said expansion chamber exceeds a predetermined value greater than said minimum.

3. A liquid control mechanism and expansion tank combination adapted to be employed in a pressurized hot water heating system, to maintain pressure in the system at all times, to allow water to enter the system as required by the system and to allow for the expansion and contraction of the water in the system as the water is heated and as the water cools off, said combination including a valve and an expansion tank, said valve comprising a hollow body member having a partition forming a chamber and a cavity, said body member having a passageway adapted to provide communication between said chamber and a pressurized hot water system, said body member having a fluid supply inlet passageway communicating with said cavity and adapted to be connected to a supply of make-up water, said partition having a valve passageway providing communication between said cavity and said chamber, valve means in said valve passageway controlling communication therethrough, said expansion tank having a flexible diaphragm with a free area substantially greater than the cross-sectional area of said expansion tank at the periphery of the diaphragm dividing the tank into two non-communicating sections, one of said sections being a pressurized section and the other being a fluid expansion section, a valve actuator engageable by and disengageable from said diaphragm when the latter is flexed in opposite directions, said actuator being operatively coupled with said valve means to effect operation thereof, means limiting movement of said valve actuator to a selected range, said flexible diaphragm being movable through a range of movement substantially greater than said valve actuator range, said diaphragm being movable in response to variations in pressure and volume of the pressurized system as opposed by the pressure in the pressure chamber; said diaphragm being movable into and out of engagement with said valve actuator to effect operation of said valve means only when said diaphragm moves within the range of movement of said valve actuator.

4. A liquid control mechanism and expansion tank combination adapted to be employed in a pressurized hot water heating system, to maintain pressure in the system at all times, to allow water to enter the system as required by the system and as air is expelled from the system and to allow for the expansion and contraction of the water in the system as the water is heated and as the water cools off, said combination including a valve and an expansion tank, said valve comprising a hollow body member having a partition forming a chamber and a cavity, said body member having a passageway adapted to provide communication between said chamber and a pressurized hot water heating system, said body member having a fluid supply inlet passageway communicating with said cavity and adapted to be connected to a supply of make-up water, said partition having a valve passageway providing communication between said chamber and said cavity, valve means in said valve passageway controlling communication therethrough, said expansion tank having a flexible diaphragm secured at its periphery within said tank and dividing said expansion tank into two non-communicating sections, one of said sections being a pressurized section and the other being a fluid expansion section, means connecting said body member with said expansion tank and providing a passageway between said chamber and said fluid expansion section, a valve actuator engageable by and disengageable from said diaphragm when the latter is flexed in opposite directions in response to pressure and volume variations in the system, said actuator being operatively coupled with said valve means and guidingly received in said passageway between said chamber and said expansion section, said flexible diaphragm having a range of movement substantially greater than said actuator range, said actuator when moved by engagement with and movement of said diaphragm actuating said valve to connect said source of make-up water and said expansion chamber when the pressure in said expansion chamber is reduced below a predetermined minimum, and said actuator when disengaged from said diaphragm actuating said valve to close communication between said expansion chamber and source of make-up water when the pressure in said expansion chamber exceeds a predetermined value greater than said minimum.

References Cited in the file of this patent

UNITED STATES PATENTS

| | | |
|---|---|---|
| 599,256 | Rowe | Feb. 15, 1898 |
| 623,934 | Wilson | Apr. 25, 1899 |
| 915,204 | Montgomery | Mar. 16, 1909 |
| 1,961,550 | Carson | June 5, 1934 |
| 2,053,931 | Work | Sept. 8, 1936 |
| 2,178,974 | Smith | Nov. 7, 1939 |
| 2,347,586 | Whitworth | Apr. 25, 1944 |
| 2,597,479 | Hammon | May 20, 1952 |